United States Patent
Couwenhoven et al.

(10) Patent No.: US 6,454,389 B1
(45) Date of Patent: Sep. 24, 2002

(54) MULTIPASS INKJET PRINTING USING PRINT MASKING

(75) Inventors: Douglas W. Couwenhoven; Rodney L. Miller, both of Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 24 days.

(21) Appl. No.: 09/658,800

(22) Filed: Sep. 11, 2000

(51) Int. Cl.[7] ............................. B41J 2/145; B41J 2/15; B41J 29/38
(52) U.S. Cl. ............................. 347/40; 347/14
(58) Field of Search ............................. 347/40, 14, 43, 347/16

(56) References Cited

U.S. PATENT DOCUMENTS 5,912,683 A * 6/1999 Eade ........................ 347/40

* cited by examiner

Primary Examiner—Thinh Nguyen
(74) Attorney, Agent, or Firm—Raymond L. Owens

(57) ABSTRACT

A method of multipass inkjet printing of images in response to digital images having code values includes providing an inkjet printer capable of printing at least two ink drops at each printing location during different passes, including a printhead which can select at least two different ink drop sizes, and selecting a number of passes for producing an image and providing a print mask having mask values which, in each pass, sequentially corresponds to predetermined pixels and, in response to the mask values and the code values of such pixels, operates the inkjet printer to select the ink drop size for each pixel in each pass so that the inkjet printer produces an image.

11 Claims, 4 Drawing Sheets

| MULTITONE LEVEL | PRINT PASS | | | |
| --- | --- | --- | --- | --- |
| | 0 | 1 | 2 | 3 |
| 0 | 0 | 0 | 0 | 0 |
| 1 | 16 | 0 | 0 | 0 |
| 2 | 32 | 8 | 0 | 0 |
| 3 | 48 | 0 | 0 | 0 |
| 4 | 64 | 0 | 10 | 0 |

FIG. 3

| | |
| --- | --- |
| 0 | 2 |
| 1 | 3 |

FIG. 4

| PRINT PASS | SELECTION VALUE |
| --- | --- |
| 0 | 0 |
| 1 | 1 |
| 2 | 0 |
| 3 | 1 |

FIG. 7

MULTIPASS INKJET PRINTING USING PRINT MASKING

FIELD OF THE INVENTION

The invention relates to multipass inkjet printing.

BACKGROUND OF THE INVENTION

A typical inkjet printer reproduces an image by ejecting small drops of ink from a printhead containing nozzles, where the ink drops land on a receiver medium (typically paper) to form ink dots. A typical inkjet printer reproduces a color image by using a set of color inks, usually cyan, magenta, yellow, and black. It is well known in the field of inkjet printing that if ink drops placed at neighboring locations on the page are printed at the same time, then the ink drops tend to flow together on the surface of the page before they soak into the page. This can give the reproduced image an undesirable grainy or noisy appearance often referred to as "coalescence". It is known that the amount of coalescence present in the printed image is related to the amount of time that elapses between printing adjacent dots. As the time delay between printing adjacent dots increases, the amount of coalescence decreases, thereby improving the image quality. There are many techniques present in the prior art that describe methods of increasing the time delay between printing adjacent dots using methods referred to as "interlacing", "print masking", or "multipass printing". There are also techniques present in the prior art for reducing one-dimensional periodic artifacts or "bands." This is achieved by advancing the paper by an increment less than the printhead width, so that successive passes or swaths of the printhead overlap. The techniques of print masking and swath overlapping are typically combined. See, for example, U.S. Pat. Nos. 4,967,203 and 5,992,962. The term "print masking" generically means printing subsets of the image pixels in multiple passes of the printhead relative to a receiver medium.

Another attribute of modern inkjet printers is that they typically possess the ability to vary (over some range) the amount of each ink that is deposited at a given location on the page. Inkjet printers with this capability are referred to as "multitone" inkjet printers because they can produce multiple density tones at each location on the page. Some multitone inkjet printers achieve this by varying the volume of the ink drop produced by the nozzle by changing the electrical signals sent to the nozzle or by varying the diameter of the nozzle. See, for example, U.S. Pat. No. 4,746,935. Other multitone inkjet printers produce a variable number of smaller, fixed size droplets that are ejected by the nozzle, all of which are intended to merge together and land at the same location on the page. See, for example, U.S. Pat. No. 5,416,612. These techniques allow the printer to vary the size or optical density of a given ink dot, which produces a range of density levels at each location, thereby improving the image quality.

Another common way for a non-multitone inkjet printer to achieve multiple density levels is to print a small amount of ink at a given location on several different passes of the printhead over that location. This results in the ability to produce a greater number of density levels than the nozzle can fundamentally eject, due to the build up of ink at the given location over several passes. See, for example, U.S. Pat. No. 5,923,349.

In all of the above mentioned inkjet printers, the designer of the printer is additionally faced with the task of splitting the image data into multiple memory buffers corresponding to the multiple passes of the printhead.

There is need for improvement over the prior art in the area of multipass printing to support both multitone and non-multitone ink jet printers which eject multiple drops at a given location on several different passes. There is also a need to combine this capability with print masking. This is necessary to maximize the image quality of the ink jet printer by minimizing coalescence and preventing the excessive use of ink.

SUMMARY OF THE INVENTION

It is an object of the present invention to provide for multipass inkjet printing which produces high quality images.

This object is achieved by a method of multipass inkjet printing of images in response to digital images having code values, comprising the steps of:

a) providing an inkjet printer capable of printing at least two ink drops at each printing location during different passes, including a printhead which can select at least two different ink drop sizes; and b) selecting a number of passes for producing an image and providing a print mask having mask values which, in each pass, sequentially corresponds to predetermined pixels and, in response to the mask values and the code values of such pixels, operates the inkjet printer to select the ink drop size for each pixel in each pass so that the inkjet printer produces an image.

The present invention determines the ink volume or drop size to be printed at a given location on a receiver medium using an inkjet printer which is capable of ejecting ink on multiple print passes at each given location. This enables the creation of more color levels without requiring excessive amounts of ink.

It is an advantage of the present invention that it may be applied to both multitone and non-multitone ink jet printers.

It is another advantage of the present invention that print masking is achieved in order to minimize coalescence.

It is another advantage of the present invention that banding artifacts may be reduced by swath overlapping.

It is another advantage of the present invention that a wide variety of ink and media combinations can be accommodated.

BRIEF DESCRIPTION OF THE DRAWINGS

FIG. 3 is a sample of a pass table of FIG. 2;

FIG. 4 is a sample of a mask table of FIG. 2;

FIG. 7 shows a raster shift table.

DETAILED DESCRIPTION OF THE INVENTION

Figure 1:
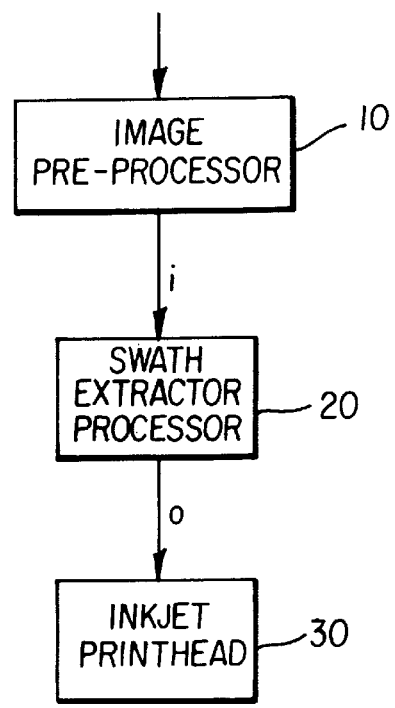
FIG. 1 is a block diagram showing an inkjet printer system which incorporates the present invention.

This invention describes a method of printing high quality digital images on a receiver medium using an inkjet printer employing multiple print passes. Turning to FIG. 1, an inkjet printer system is shown in which an image preprocessor 10 receives a digital image from a host computer (not shown), and performs standard image processing functions such as sharpening, resizing, color conversion, and multitoning to produce a multitoned image signal i. The multitoned image signal i is composed of a set of color data planes hereinafter referred to as color channels. Each color channel corresponds to a particular colorant in the printer, such as the cyan, magenta, yellow, or black inks used in a typical inkjet printer. The data comprising each color channel is a two dimensional array (width=w, height=h) of individual picture elements, or "pixels". The pixel's location in the image is specified by its (x,y) coordinates in the array, where $0<x<w-1$ and $0<y<h-1$. The x location of the pixel is also referred to as the row coordinate value, and the y location of the pixel is referred to as the column coordinate value. The term "signal" is used to generically refer to the array of pixels having digital code values that form the image.

A swath extractor processor 20 then receives the multitoned image signal i and generates a printhead image signal o, which controls the volume of ink printed by an inkjet printhead (or printheads) 30. The processes of print masking and multipass drop formation are contained within the swath extractor processor 20, and will be described in detail hereinafter. Prior to multitoning, each pixel contains a numeric code value (typically on the range {0,255}) that indicates the amount of the corresponding colorant to be placed at the given pixel's location in the image. After multitoning (at the output of the image preprocessor 10), the range of pixel code values has been reduced to match the number of density levels that the inkjet printer can produce. For binary inkjet printers, the pixel code values will be either 0 or 1, indicating whether to print 0 or 1 drops of ink. Multitone inkjet printers will accept pixel code values on the range {0,N−1}, where N is the number of density levels that the multitone inkjet printer can produce.

Figure 2:
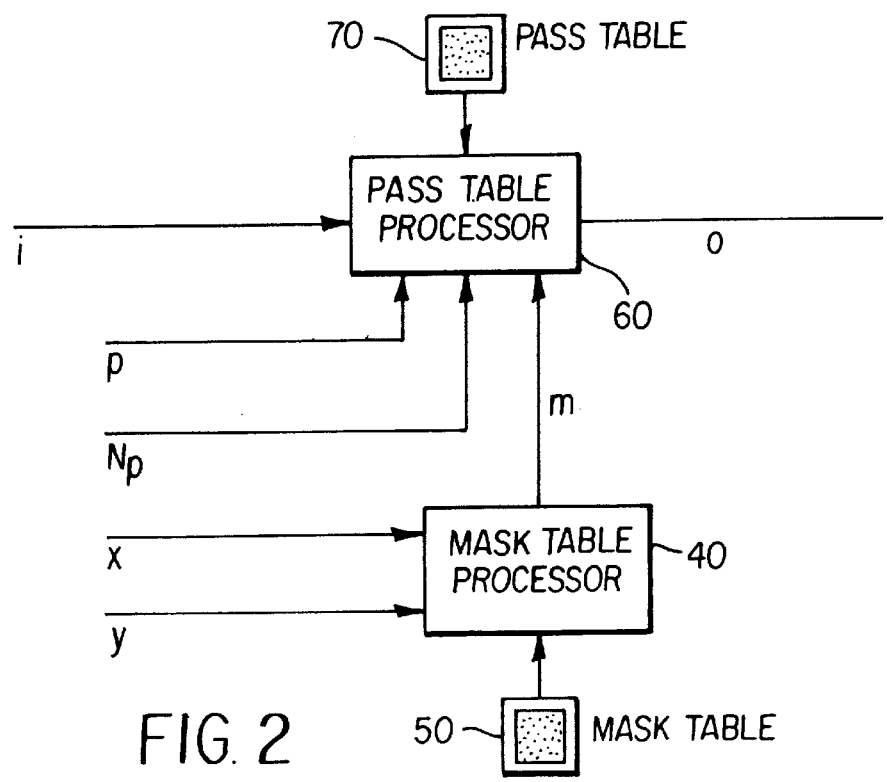
FIG. 2 is a block diagram showing the details of the swath extractor processor of FIG. 1.

Turning now to FIG. 2, the details of the swath extractor processor 20 are shown. A "swath" of data is defined as the subset of multitoned image signal i that is required during one motion of the printhead across the page. In FIG. 2, a mask table processor 40 receives a mask table 50 and the (x,y) coordinates of the current pixel being processed to produce a mask value m. In a preferred embodiment of the present invention, the mask table 50 may be stored in a data file which resides on a disk storage medium in a computer which implements the swath extractor processor 20. Another embodiment of the present invention may have the swath extractor processor 20 implemented in an embedded computer within an inkjet printer, and the mask table 50 may be stored in programmable memory within the printer. One skilled in the art will recognize that there are many different hardware configurations for the swath extractor processor 20 and many different storage options for the mask table 50 that may be constructed, and that the present invention may be applied to any of the different configurations.

In a preferred embodiment of the present invention, the mask value m is computed by the mask table processor 40 according to the following equation:

$$m=\text{MaskTable}(x\%m_x, y\%m_y) \quad \text{EQ 1}$$

where $m_x$ and $m_y$ are the number of rows and columns (respectively) of the mask table 50, x and y are the row and column coordinates (respectively) of the current pixel, and the % symbol indicates the mathematical modulo operator. An example of a mask table 50 which has $m_x=m_y=2$ is shown in FIG. 4. Thus, the mask value m is simply extracted from the mask table 50 via table look up using the (x,y) coordinates of the current pixel.

Referring again to FIG. 2, a pass table processor 60 receives the mask value m, the multitoned image signal i, a pass table 70, a first pass index p, and a number of passes Np to produce the printhead image signal o. The first pass index p is simply an integer counter that counts the number of printhead motions across the page. Typically, the first pass index p is set to zero at the beginning of a print and is incremented by 1 each time a swath of data is produced by the swath extractor processor 20. Since the first pass index is computed and used by the swath extractor processor 20, it may be generated and stored internally to the swath extractor processor 20. The number of passes Np is set equal to the number of columns in the pass table 70. Since the number of passes Np is computed and used only by the swath extractor processor 20, it may be stored internally in a similar manner as the first pass index p. The pass table 70 is a two dimensional look up table that contains values of the printhead image signal o, and the table may be stored and retrieved from a variety of physical locations, as was described earlier for the mask table 50. A sample pass table 70 is shown in FIG. 3. The data values contained in the pass table 70 may be in a variety of different formats, depending on the signals that the electronic circuitry that activates the printhead is designed to accept. For example, the electronic circuitry that activates the printhead may be designed to accept ink drop volumes in picoliters. Thus, the electronic circuitry that activates the printhead would convert the printhead image signal o, which would contain desired ink drop volumes, into electrical signals that instruct the printhead to produce the desired volumes. It is important to note that the format of the data values in the pass table 70 is not fundamental to the invention, and the invention may be applied to create a printer image signal o for any particular printhead by using the appropriate data values in the pass table 70.

Still referring to FIG. 2, the value of the printer image signal o for the current pixel is retrieved from the two dimensional pass table 70 by computing a row index and a column index which are used to address the table. The row index is computed from the multitoned image signal i value according to:

$$\text{row}=i(x, y) \quad \text{EQ 2}$$

where (x,y) are the coordinates of the current pixel. The column index is computed according to the following equation:

$$\text{col}=(p+m)\%N_p \quad \text{EQ 3}$$

where p is the first pass index, m is the mask value, and Np is the number of passes. The printer image signal o for the current pixel is extracted from the pass table 70 by indexing the table with the row and column indexes:

$$o(x,y)=\text{PassTable}(\text{row},\text{col}) \quad \text{EQ 4}$$

Figure 5:
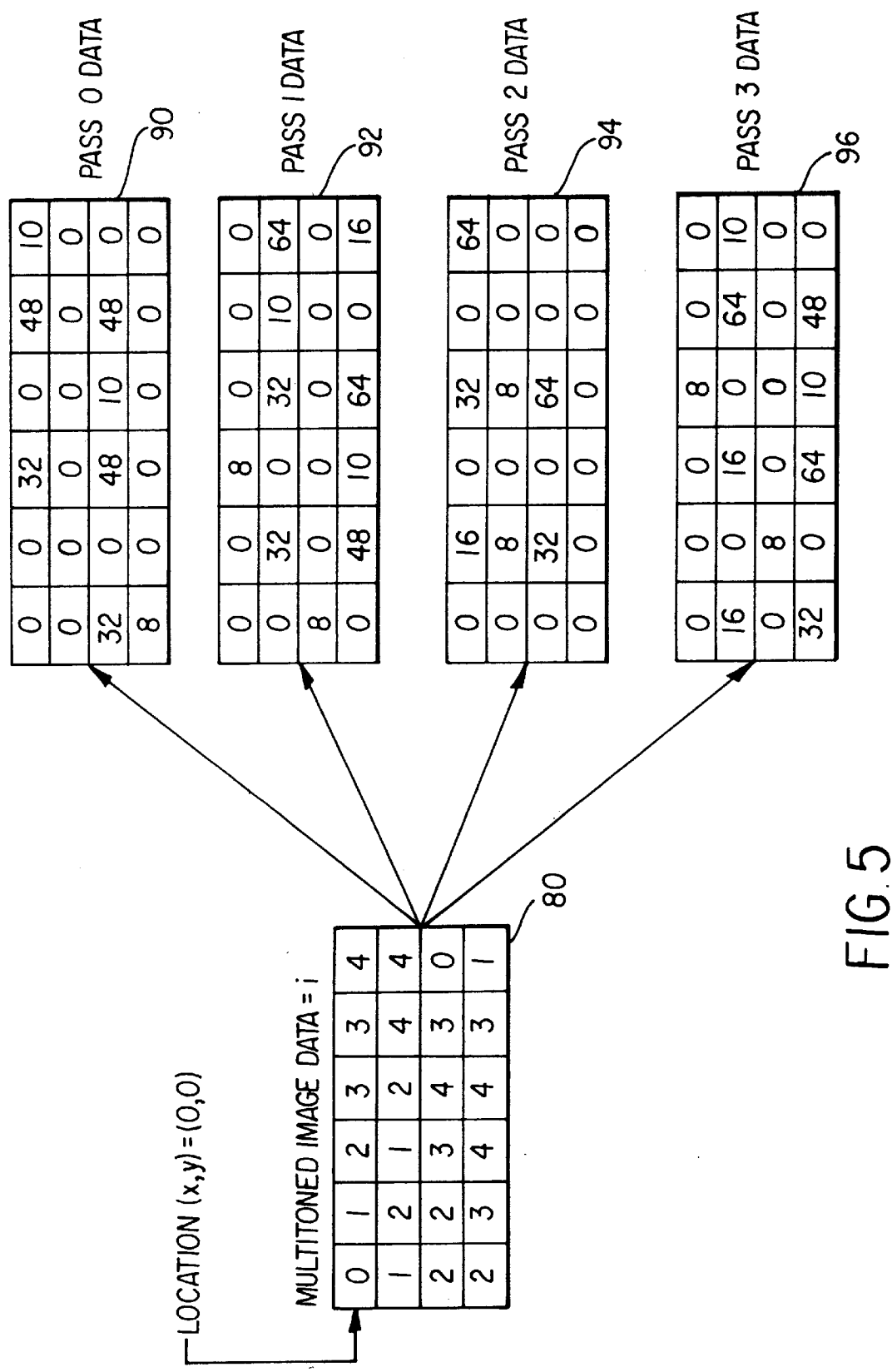
FIG. 5 is a drawing illustrating the application of the method of the present invention to a 4×6 section of multitoned image signal i pixels.

Turning now to FIG. 5, a printing example demonstrating the method of the present invention is shown. In FIG. 5, a 4×6 pixel section 80 of the multitoned image signal i is shown. In this example, a multitone inkjet printer that can produce 5 density levels is used, as indicated by the values 0 through 4 for the multitoned image signal i. Recall that the multitoned image signal i is created by the image preprocessor 10 of FIG. 1. Referring again to FIG. 5, four swaths 90, 92, 94, 96 of the printhead image signal o are shown which were created according to the present invention using the pass table of FIG. 3 and the mask table of FIG. 4. These four swaths 90, 92, 94, 96 are then printed on four subsequent passes of the printhead over the same region of the page to produce the desired output image. For further illustration, consider how a single pixel of the multitoned image signal i is converted into the four swaths 90, 92, 94, 96. As an example, we will consider the lower left pixel of the 4×6 section 80 of the multitoned image signal i, which has a value of "2" at location (x,y)=(3,0). Using this location and the mask table of FIG. 4, a mask value is computed according to EQ 1:

$$m = MaskTable(x\%m_x, y\%m_y)$$
$$= MaskTable(3\%2, 0\%2)$$
$$= MaskTable(1, 0)$$
$$= 1$$

The number of passes Np=4, which is the number of columns in the pass table of FIG. 3 (excluding the index column). The row index of the pass table is computed according to EQ 2:

$$row = i(x, y)$$
$$= i(3, 0)$$
$$= 2$$

On the first pass, the first pass index p has a value of 0, and the column index is computed according to EQ 3:

$$col = (p + m)\%N_p$$
$$= (0 + 1)\%4$$
$$= 1$$

The printhead image signal o value for pass 0 is then retrieved from the pass table according to EQ 4:

$$o = PassTable(row, col)$$
$$= PassTable(2, 1)$$
$$= 8$$

On the next 3 passes, the first pass index p has the values 1,2, and 3, respectively. This results in column indexes of 2,3, and 0, respectively, as computed by EQ 3. The corresponding printhead image signal o values are 0, 0, and 32, respectively, as computed by EQ 4. Thus, on the four passes, the multitoned image signal i value of 2 is converted to printhead image signal o values of 8,0,0,32 as shown in the lower left corner of the four swaths 90, 92, 94, 96 of FIG. 5.

It should be noted that although the four swaths of the printhead image signal o are conceptually printed (for demonstration purposes) on four consecutive motions of the printhead over the same region of the page, there are other methods of interlacing the swaths to which the present invention applies equally well. For example, rather than having the printhead pass over the same region on the page four times before the page is moved, the page instead may be advanced by $\frac{1}{4}^{th}$ of the printhead height after each pass. This is described in the prior art references to print masking and interlacing referenced above, but was not presented in the description of the present invention in order to more clearly set forth the invention. However, the invention applies equally well to all forms of printing involving print masking or interlaced swath printing.

It will also be obvious to one skilled in the art that the present invention may be applied to each color channel of a color inkjet printer. In this case, each color channel has its own pass table and mask table.

Figure 6:
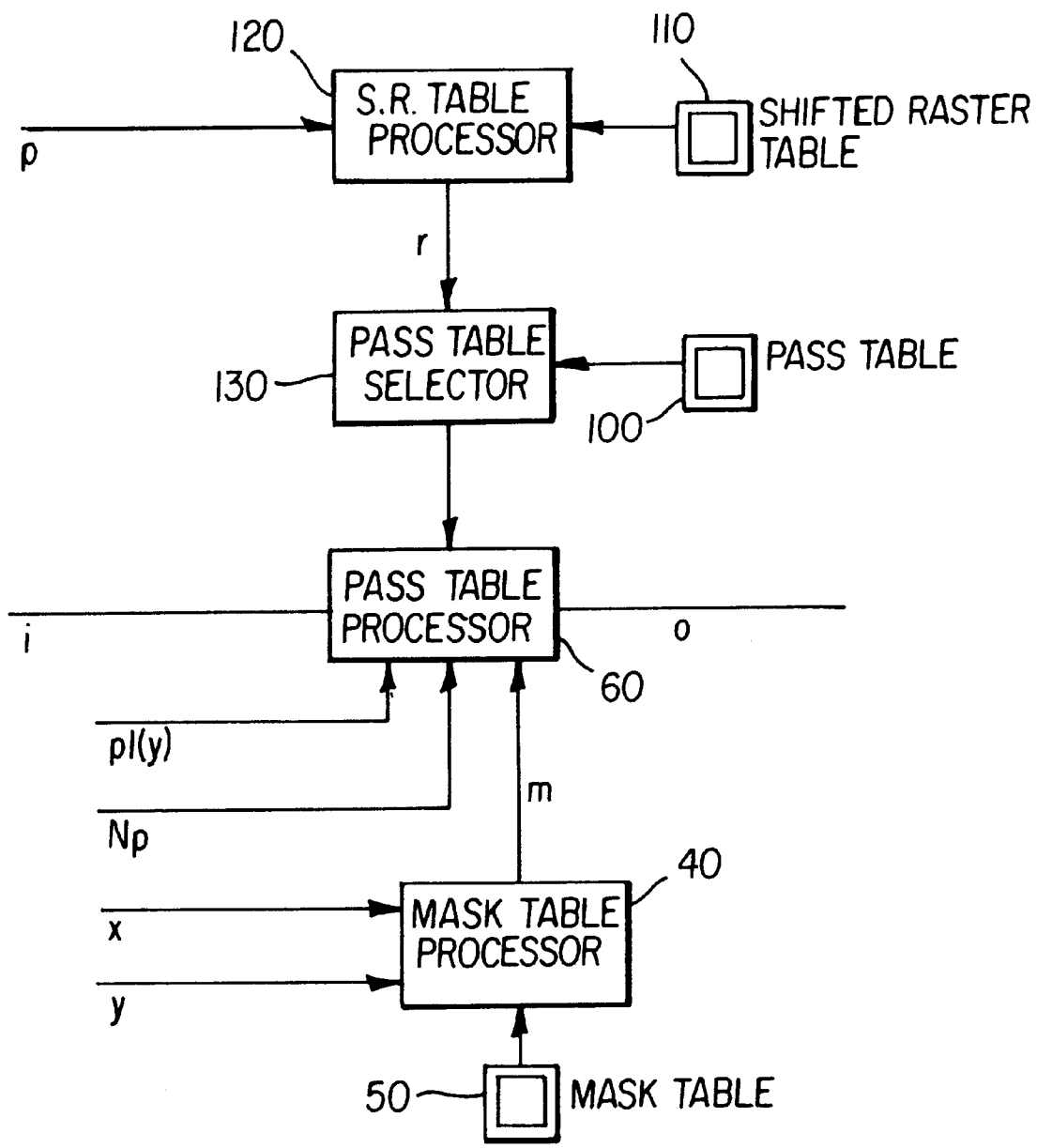
FIG. 6 depicts another embodiment of this invention.

Turning now to FIG. 6, another embodiment of the invention is shown in which additional processing has been included to select the pass table that is used in the pass table processor 60. This embodiment is useful for printers that are able to print on multiple raster grids to reproduce the image. This is commonly done in inkjet printing when the spacing between the nozzles on the printhead is larger than the desired spacing between pixels on the page. For example, a printhead with nozzle spacing of 300 nozzles per inch (NPI) can be used to print an image at 600 dots per inch (DPI) by interleaving four 300 DPI rasters, one of which is called the "reference raster", and the others are called the "shifted rasters". Note that higher resolutions such as 900 DPI or 1200 DPI may be printed by incorporating more shifted rasters. It may be advantageous for the printer to use different pass tables on each of the available rasters to provide the best image quality. The process by which the different pass tables are selected and used in printing will now be described. Returning to FIG. 6, a shifted raster table processor 120 is used to produce a selection value, r, in response to a shifted raster table 110 and the first pass index, p, which is an integer counter that counts the number of printhead motions across the page, as was described in an earlier embodiment. The shifted raster processor 120 retrieves the selection value from the shifted raster table 110 by computing a row index in response to the first pass index p and the number of passes, Np, and then indexing the shifted raster table 110 with the row index to produce the selection value r according to the following equations:

$$row = (p)\%N_p \qquad \text{EQ 5}$$

$$r = ShiftedRasterTable(row) \qquad \text{EQ 6}$$

An example of a shifted raster table 110 is shown in FIG. 7, in which the selection value indicates whether to use a reference raster (0) or a shifted raster (1) for the current print pass. Still referring to FIG. 6, a pass table selector 130 receives the selection value r, and selects a pass table to use for this pass from a set of pass tables 100 by simply selecting the pass table that corresponds to the selection value. The selected pass table is then received by the pass table processor 60, and the printhead image signal o is computed in the same manner as described in the first embodiment. The only other difference between the first and second embodiments is that the pass table processor 60 receives a second pass index, p1(y), instead of the first pass index p. The second pass index p1(y) is an integer counter that is maintained separately for each row of the image, and simply counts the number of times that a nozzle on the printhead has passed directly over the given row number, y. The second pass index is required because the first pass index counts the total number of printhead motions, regardless of which raster the nozzles in the printhead line up with.

The invention has been described in detail with particular reference to certain preferred embodiments thereof, but it will be understood that variations and modifications can be effected within the spirit and scope of the invention.

Parts List

10 image preprocessor
20 swath extractor processor
30 inkjet printhead 40 mask table processor
50 mask table
60 pass table processor
70 pass table
80 4×6 section of multitoned image signal i
90 swath of printhead image signal o for pass 0
92 swath of printhead image signal o for pass 1
94 swath of printhead image signal o for pass 2
96 swath of printhead image signal o for pass 3
100 set of pass tables
110 shifted raster table
120 shifted raster table processor
130 pass table selector

What is claimed is:

1. A method of multipass inkjet printing of images in response to digital images having pixels that are assigned code values, comprising the steps of:
    a) providing an inkjet printer capable of printing at least two ink drops at each printing location during different passes, including a printhead which can select at least two different ink drop sizes; and
    b) selecting a number of passes for producing an image and providing a print mask having mask values which, in each pass, sequentially corresponds to predetermined pixels and, in response to the mask values and the code values of such pixels, operates the inkjet printer to select the ink drop size for each pixel in each pass so that the inkjet printer produces an image.

2. The method of claim 1 wherein the inkjet printer is adapted to produce ink drops having different colorants so as to produce a colored image.

3. The method of claim 1 wherein the volume of ink is computed for each pixel during each pass to determine the ink drop size which is selected.

4. A method of reproducing a digital image containing an array of pixel code values by determining ink volume to be printed at each pixel location on a receiver medium and using an inkjet printer which is capable of multiple print passes, comprising the steps of:
    a) computing a row index for a first look up table responsive to each pixel code value;
    b) computing a column index for the first look up table in response to the location of each pixel, a first pass index, and a number of passes so that the first look up table provides information related to the drop size for each pixel for each pass; and
    c) indexing the first look up table with said row index and column index for each pixel for each pass to determine an ink volume to be printed at the given pixel location; and
    d) using the inkjet printer to print the ink volume at each pixel location for each pass to reproduce the image.

5. The method of claim 4 wherein step b) further includes:
    i) indexing a second look up table responsive to the given pixel location to produce a mask value, and
    ii) computing the column index of the first look up table in response to the mask value, the first pass index, and the number of passes.

6. The method of claim 5 wherein step a) includes:
    iii) computing a second row index value as the modulo of a row coordinate value of the given pixel location with a number of rows in the second look up table,
    iv) computing a second column index value as the modulo of a column coordinate value of the given pixel location with a number of columns in the second look up table, and
    v) indexing the second look up table with the second row index value and the second column index value to produce the mask value.

7. The method of claim 5 wherein step b) further includes computing a first value as the sum of the first pass index and the mask value, and computing the column index as the modulo of the first value with the number of passes.

8. The method of claim 4 wherein the inkjet printer is adapted to produce ink drops having different colorants so as to produce a colored image.

9. A method of reproducing a digital image containing an array of pixel code values by determining ink volume to be printed at each pixel location on a receiver medium and using an inkjet printer which is capable of multiple print passes, comprising the steps of:
    a) selecting a first look up table from a set of look up tables in response to a first pass index;
    b) computing a row index for the selected first look up table in response to each pixel code value;
    c) computing a column index for the selected first look up table in response to the given pixel location, a second pass index, and a number of passes so that the selected first look up table provides information related to the drop size for each pixel for each pass;
    d) indexing the selected first look up table with said row index and column index for each pixel for each pass to determine an ink volume to be printed at the given location; and
    e) using the inkjet printer to print the ink volume at each pixel location for each pass to reproduce the image.

10. The method of claim 9 wherein the inkjet printer is adapted to produce ink drops having different colorants so as to produce a colored image.

11. The method of claim 9 wherein step a) includes:
    i) indexing a third look up table in response to the first pass index to produce a selection value, and
    ii) selecting the first look up table from a set of look up tables in response to the selection value.

* * * * *